(12) United States Patent
Hartzler et al.

(10) Patent No.: US 11,585,419 B1
(45) Date of Patent: Feb. 21, 2023

(54) CONSTANT-ON DOUBLE COAST ENGAGEMENT DIAPHRAGM SPRING

(71) Applicant: SCHAEFFLER TECHNOLOGIES AG & CO. KG, Herzogenaurach (DE)

(72) Inventors: Baylor Hartzler, Creston, OH (US); David Avins, Burbank, OH (US); Franco Filice, Medina, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 17/675,862

(22) Filed: Feb. 18, 2022

(51) Int. Cl.
  *F16H 45/02* (2006.01)
(52) U.S. Cl.
  CPC ..... *F16H 45/02* (2013.01); *F16H 2045/0205* (2013.01); *F16H 2045/0278* (2013.01)
(58) Field of Classification Search
  CPC ............. F16H 45/02; F16H 2045/0205; F16H 2045/0278; F16D 33/18
  See application file for complete search history.

(56) References Cited

U.S. PATENT DOCUMENTS

| 3,852,955 | A | * | 12/1974 | Wonn | F16H 41/26 |
| | | | | | 60/356 |
| 3,986,356 | A | * | 10/1976 | Frotschner | F16H 61/52 |
| | | | | | 60/362 |
| 10,151,376 | B2 | * | 12/2018 | Saleh | F16H 41/28 |
| 10,520,072 | B2 | * | 12/2019 | Vanni | F16H 61/54 |

* cited by examiner

*Primary Examiner* — Huan Le

(57) ABSTRACT

An apparatus and methods for a double coast engagement diaphragm spring for a torque converter are provided. The double coast engagement diaphragm spring includes first and second coast engagement diaphragm springs. The first coast engagement diaphragm spring exerts a first, continuous axial thrust onto a turbine comprising the torque converter. The second coast engagement diaphragm spring applies a second axial thrust onto the turbine only during coasting conditions. A drive flange includes ramps for engaging the second coast engagement diaphragm spring during coasting conditions and causing the second coast engagement diaphragm spring to apply the second axial thrust onto the turbine. A retainer plate disengages the second coast engagement diaphragm spring during drive conditions. A spacer ring between the first coast engagement diaphragm spring and the second coast engagement diaphragm spring causes the first and second coast engagement diaphragm springs to operate in series.

20 Claims, 2 Drawing Sheets

CONSTANT-ON DOUBLE COAST ENGAGEMENT DIAPHRAGM SPRING

FIELD

Embodiments of the present disclosure generally relate to torque converters. More specifically, embodiments of the disclosure relate to an apparatus and methods for a double coast engagement diaphragm spring for a clutch system of a torque converter.

BACKGROUND

Automotive vehicles with automatic transmissions generally are equipped with a torque converter. The torque converter is a fluid coupling that transfers rotational power from an engine to an automatic transmission. Torque converters typically include a front cover fixed to an impeller that rotate as a unit to transfer fluid through the torque converter and cause a turbine to rotate. The turbine generally transfers rotational power to planetary gears comprising the automatic transmission.

To improve fuel economy, many torque converters include a bypass or lockup clutch that mechanically couples the turbine to a case of the torque converter to bypass the fluid coupling. When the lockup clutch is engaged, drive wheels of a motor vehicle are generally driven directly by an engine without participation of the fluid coupling. While the vehicle is in drive, fluid pressure between the front plate and the turbine is sufficient to apply the lockup clutch. During coasting conditions, however, the fluid pressure on the turbine drops and another form of thrust must be applied to the turbine to keep the clutch engaged.

In general, a load must be applied to the turbine to assist with applying the lockup clutch. In many embodiments, the lockup clutch is applied by way of a coast engagement diaphragm spring that applies thrust load to the turbine when a damper is wound in the coast direction. In some instances, however, the thrust load of a single coast engagement diaphragm spring may not be sufficient to apply the clutch during coasting conditions. It has been observed that in some instances one coast engagement diaphragm spring may be limited by too much hysteresis in the damper during drive conditions and not enough thrust load during coasting conditions. Embodiments presented herein provide a double coast engagement diaphragm spring for a clutch system of a torque converter that overcomes these and other limitations, as described herein.

SUMMARY

An apparatus and methods for a double coast engagement diaphragm spring for a torque converter are provided. The double coast engagement diaphragm spring includes a first coast engagement diaphragm spring and a second coast engagement diaphragm spring. The first coast engagement diaphragm spring is configured to exert a first, continuous axial thrust onto a turbine comprising the torque converter. The second coast engagement diaphragm spring is configured to apply a second axial thrust onto the turbine during coasting conditions. A drive flange includes ramps for engaging the second coast engagement diaphragm spring during coasting conditions and causing the second coast engagement diaphragm spring to apply the second axial thrust onto the turbine. A retainer plate is configured to disengage the second coast engagement diaphragm spring only during drive conditions. A spacer ring is disposed between the first coast engagement diaphragm spring and the second coast engagement diaphragm spring, such that the first coast engagement diaphragm spring and the second coast engagement diaphragm spring operate in series.

In an exemplary embodiment, a double coast engagement diaphragm spring for a torque converter comprises: a first coast engagement diaphragm spring for exerting a first axial thrust onto a turbine; a second coast engagement diaphragm spring for exerting a second axial thrust onto the turbine; a spacer ring disposed between the first coast engagement diaphragm spring and the second coast engagement diaphragm spring; a drive flange for engaging the second coast engagement diaphragm spring during coasting conditions; and a retainer plate for disengaging the second coast engagement diaphragm spring during drive conditions.

In another exemplary embodiment, the first coast engagement diaphragm spring and the second coast engagement diaphragm spring are arranged in series. In another exemplary embodiment, the first coast engagement diaphragm spring and the second coast engagement diaphragm spring provide first axial thrust and the second axial thrust in combination to overcome turbine thrust loads and engage a lockup clutch during coasting conditions. In another exemplary embodiment, the spacer ring is configured to provide a stack path through the torque converter for the first coast engagement diaphragm spring and the second coast engagement diaphragm spring.

In another exemplary embodiment, the first coast engagement diaphragm spring is disposed between the drive flange and the spacer ring. In another exemplary embodiment, the first coast engagement diaphragm spring is configured to exert the first axial thrust onto the turbine so as to keep a lockup clutch engaged during drive conditions and during coasting conditions. In another exemplary embodiment, the spacer ring is configured to conduct the first axial thrust from the first coast engagement diaphragm spring through an inner diameter of the second coast engagement diaphragm spring to the turbine. In another exemplary embodiment, the first axial thrust is low enough to not introduce excessive torque to turn.

In another exemplary embodiment, the drive flange includes ramps configured to engage the second coast engagement diaphragm spring during coasting conditions. In another exemplary embodiment, the ramps engage the second coast engagement diaphragm spring when a damper assembly of the torque converter is in coast. In another exemplary embodiment, the second coast engagement diaphragm spring exerts the second axial thrust on the turbine in addition to the first axial thrust due to the first coast engagement diaphragm spring.

In an exemplary embodiment, a method for a double coast engagement diaphragm spring for a torque converter comprises: configuring a first coast engagement diaphragm spring to exert a first axial thrust onto a turbine; configuring a second coast engagement diaphragm spring to exert a second axial thrust onto the turbine; disposing a spacer ring between the first coast engagement diaphragm spring and the second coast engagement diaphragm spring; forming a drive flange to engage the second coast engagement diaphragm spring during coasting conditions; and configuring a retainer plate to disengage the second coast engagement diaphragm spring during drive conditions.

In another exemplary embodiment, disposing the spacer ring includes arranging the first coast engagement diaphragm spring and the second coast engagement diaphragm spring in series. In another exemplary embodiment, arranging includes configuring the first coast engagement diaphragm spring to exert the first axial thrust onto the turbine so as to keep a lockup clutch engaged during drive conditions and during coasting conditions. In another exemplary embodiment, arranging includes configuring the spacer ring to conduct the first axial thrust from the first coast engagement diaphragm spring through an inner diameter of the second coast engagement diaphragm spring to the turbine. In another exemplary embodiment, arranging includes configuring the first coast engagement diaphragm spring such that the first axial thrust is low enough to not introduce excessive torque to turn.

In another exemplary embodiment, forming the drive flange includes forming ramps on the drive flange configured to engage the second coast engagement diaphragm spring during coasting conditions. In another exemplary embodiment, forming the ramps includes configuring the ramps to engage the second coast engagement diaphragm spring when a damper assembly of the torque converter is in coast. In another exemplary embodiment, forming the ramps includes configuring the second coast engagement diaphragm spring to exert the second axial thrust on the turbine in addition to the first axial thrust due to the first coast engagement diaphragm spring.

In an exemplary embodiment, a method for a double coast engagement diaphragm spring for a torque converter comprises: configuring a first coast engagement diaphragm spring to continuously exert a first axial thrust onto a turbine; configuring a second coast engagement diaphragm spring to exert a second axial thrust onto the turbine; arranging the first coast engagement diaphragm spring and the second coast engagement diaphragm spring in series; configuring a spacer ring to be disposed between the first coast engagement diaphragm spring and the second coast engagement diaphragm spring; configuring a drive flange to engage the second coast engagement diaphragm spring during coasting conditions; and configuring a retainer plate to disengage the second coast engagement diaphragm spring during drive conditions.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
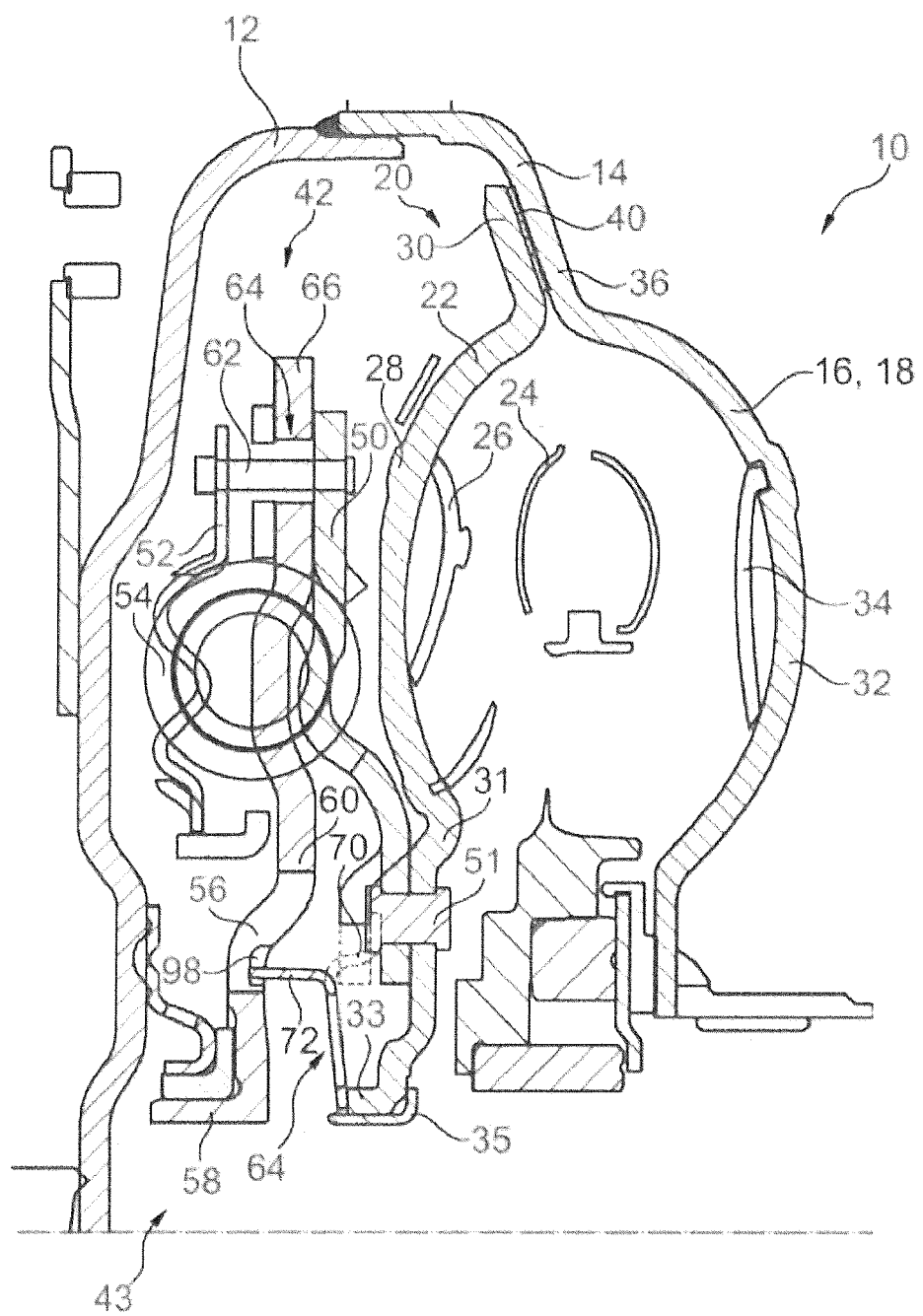
FIG. 1 illustrates a cross-sectional side view of a torque converter, according to the present disclosure.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the double coast engagement diaphragm spring and methods disclosed herein may be practiced without these specific details. In other instances, specific numeric references such as "first spring," may be made. However, the specific numeric reference should not be interpreted as a literal sequential order but rather interpreted that the "first spring" is different than a "second spring." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, a load must be applied to a turbine to assist with applying a lockup clutch of an automatic transmission. In many embodiments, the lockup clutch is applied by way of a single coast engagement diaphragm spring that applies thrust load to the turbine when a damper is wound in a coast direction. In some instances, however, the thrust load of the single coast engagement diaphragm spring may not be sufficient to apply the clutch during coasting conditions. Embodiments presented herein provide a double coast engagement diaphragm spring for a clutch system of a torque converter that overcomes these and other limitations, as described herein.

FIG. 1 illustrates a cross-sectional side view of a torque converter 10 in accordance with an embodiment of the present disclosure. Torque converter 10 includes a front cover 12 for connecting to a crankshaft of an internal combustion engine and a rear cover 14 forming a shell 16 of an impeller or pump 18. Torque converter 10 also includes a turbine 20 configured to define a piston that is axially moveable toward and away from impeller 18 to engage and disengage an impeller clutch of impeller 18 so as to form a lockup clutch. Turbine 20 includes a turbine shell 22 and an inner ring 24 supporting a plurality of turbine blades 26 therebetween. Turbine shell 22 includes a rounded blade supporting portion 28 for supporting of turbine blades 26 at a front cover side of the blades 26. Radially outside of blade supporting portion 28, an outer radial extension 30, which forms the piston, radially protrudes outwardly from an outer circumference of blade supporting portion 28. Accordingly, the piston and turbine shell 22 are formed as a single piece. Radially inside of blade supporting portion 28, turbine shell 22 includes an inner radial extension 31 that, at an inner radial end thereof, joins an axially extending inner circumferential section 33, whose inner circumferential surface contacts an outer circumferential surface of a hub 35. Impeller shell 16 includes a rounded blade supporting portion 32 for supporting a plurality of impeller blades 34. Radially outside of blade supporting portion 32, a radially extending wall 36, which forms an impeller clutch, radially protrudes outwardly from an outer circumference of rounded blade supporting portion 32. Accordingly, the impeller clutch and impeller shell 16 are formed as a single piece.

A friction material 40 is bonded onto a surface of outer radial extension 30 for engaging radially extending wall 36. In some embodiments, instead of or in addition to being bonded to outer radial extension 30, friction material 40 may be bonded to radially extending wall 36. A damper assembly 42, which together with turbine 20 form a drive assembly 43 of torque converter 10, is positioned between front cover 12 and turbine 20 and is configured for transferring torque from turbine 20 to a transmission input shaft. Damper assembly 42 includes two cover plates—a turbine side cover plate 50, which is riveted to turbine 20 by rivets 51, and a front cover side cover plate 52. Cover plates 50, 52 support a set of arc springs 54 axially therebetween. Damper assembly 42 also includes a drive flange 56 positioned axially between cover plate 50, 52. Drive flange 56 includes an inner radial hub 58 configured for non-rotatably connecting to a transmission input shaft. Drive flange 56 further includes circumferentially extending slots 60 for receiving springs 54. Radially outside of springs 54, cover plates 50, 52 are fixed together by a plurality of circumferentially spaced rivets 62. Rivets 62 pass through cover plates 50, 52 into circumferential spaces 64 formed between outer tabs 66 extending from a radial outer end of drive flange 56.

Outer radial extension 30 of turbine 20 engages impeller 18 at radially extending wall 36 via friction material 40 to transfer torque input into front cover 20 by the engine crankshaft to the transmission input shaft. As turbine 20 is driven by impeller 18, either through contact via friction material 40 and impeller shell 16 when the lockup clutch is locked or through fluid flow between blades 26, 34, turbine 20 transfers torque to damper assembly 42 via rivets 51. Cover plates 50, 52 transfer torque from turbine 20 to drive flange via springs 54. Drive flange 56 in turn drives the transmission input shaft.

Damper assembly 42 further includes a bias spring 64, which in this embodiment is a diaphragm spring, that is axially between drive flange 56 and turbine 20. The bias spring 64 engages cover plate 50 and drive flange 56. Bias spring 64 is preloaded, i.e., compressed between drive flange 56 and turbine 20, during installation and does not relax to a free state. When in drive, there is no axial force being transmitted by bias spring 64, and therefore damper assembly 42 has no additional hysteresis, which may be beneficial for NVH (i.e., "noise," "vibration," and "harshness") performance, and the performance during a shift event can be equal to that of a baseline torque converter. Additionally, damper assembly 42 is arranged and configured to limit the axial force generated by ramps 98 and ramps comprising the bias spring 64 to prevent the piston from self-locking during the coast condition. More specifically, the maximum load produced in the coast condition is limited by the load characteristics of the bias spring 64 and the geometry of the ramps 98 to prevent the lockup clutch from self-locking at high coast torques during the coast condition.

Figure 2:
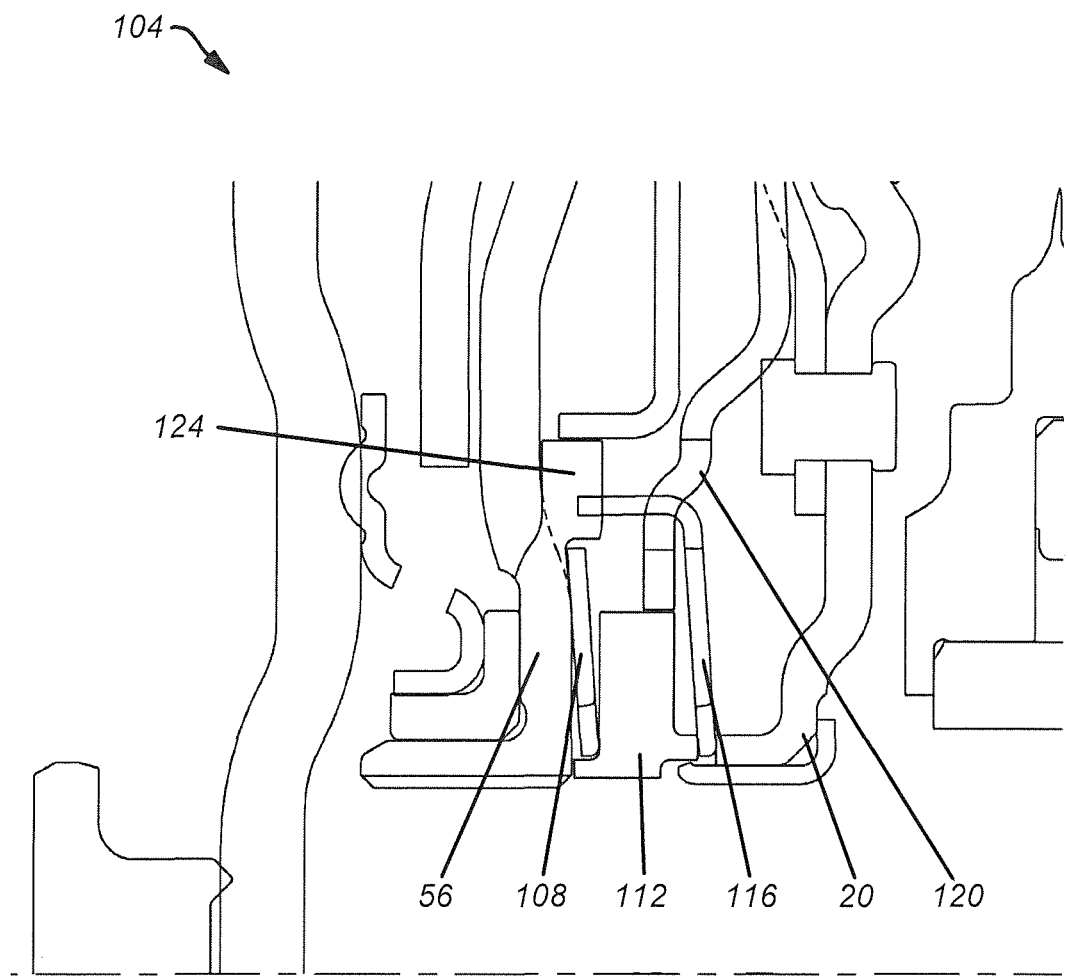
FIG. 2 illustrates a cross-sectional side view of a torque converter comprising an exemplary embodiment of a double coast engagement diaphragm spring, in accordance with the present disclosure.

FIG. 2 illustrates a cross-sectional side view of a torque converter 104 comprising an exemplary embodiment of a double coast engagement diaphragm spring (hereinafter, "CEDS"), in accordance with the present disclosure. The torque converter 104 shown in FIG. 2 is substantially similar to the torque converter 10 of FIG. 1, with the exception that the torque converter 104 includes a first CEDS 108, a spacer ring 112, a second CEDS 116, and a retainer plate 120. In general, the first and second CEDSs 108, 116 are arranged in series such that they provide axial spring loads in combination to overcome turbine thrust loads and engage a lockup clutch during coasting conditions. The spacer ring 112 is configured to provide a stack path through the torque converter 104 for the first and second CEDSs 108, 116.

The first CEDS 108 is disposed between a drive flange 56 and the spacer ring 112. The first CEDS 108 is configured to exert a continuous axial load onto the turbine 20 so as to keep the lockup clutch (see FIG. 1) engaged during drive conditions as well as during coasting conditions. The axial load of the first CEDS 108 is applied by way of the spacer ring 112 and an inner diameter of the second CEDS 116. It is contemplated that the axial load of the first CEDS 108 is low enough such that the turbine 20 does not apply a drive torque to the transmission input shaft. Further, the drive flange 56 includes ramps 124 configured to engage the second CEDS 116 during coasting conditions. The ramps 124 engage the second CEDS 116 when the damper assembly 42 (see FIG. 1) is in coast, as described herein. Thus, during coasting conditions, the second CEDS 116 exerts an axial thrust on the turbine 20, in addition to the thrust due to the first CEDS 108. Upon a return to drive conditions, the retainer plate 120 disengages the second CEDS 116, as described herein.

While the double coast engagement diaphragm spring and methods have been described in terms of particular variations and illustrative figures, those of ordinary skill in the art will recognize that the double coast engagement diaphragm spring is not limited to the variations or figures described. In addition, where methods and steps described above indicate certain events occurring in certain order, those of ordinary skill in the art will recognize that the ordering of certain steps may be modified and that such modifications are in accordance with the variations of the double coast engagement diaphragm spring. Additionally, certain of the steps may be performed concurrently in a parallel process when possible, as well as performed sequentially as described above. To the extent there are variations of the double coast engagement diaphragm spring, which are within the spirit of the disclosure or equivalent to the double coast engagement diaphragm spring found in the claims, it is the intent that this patent will cover those variations as well. Therefore, the present disclosure is to be understood as not limited by the specific embodiments described herein, but only by scope of the appended claims.

What is claimed is:

1. A double coast engagement diaphragm spring for a torque converter, comprising:
   a first coast engagement diaphragm spring for exerting a first axial thrust onto a turbine;
   a second coast engagement diaphragm spring for exerting a second axial thrust onto the turbine;
   a spacer ring disposed between the first coast engagement diaphragm spring and the second coast engagement diaphragm spring;
   a drive flange for engaging the second coast engagement diaphragm spring during coasting conditions; and
   a retainer plate for disengaging the second coast engagement diaphragm spring during drive conditions.

2. The double coast engagement diaphragm spring of claim 1, wherein the first coast engagement diaphragm spring and the second coast engagement diaphragm spring are arranged in series.

3. The double coast engagement diaphragm spring of claim 2, wherein the first coast engagement diaphragm spring and the second coast engagement diaphragm spring provide first axial thrust and the second axial thrust in combination to overcome turbine thrust loads and engage a lockup clutch during coasting conditions.

4. The double coast engagement diaphragm spring of claim 1, wherein the spacer ring is configured to provide a stack path through the torque converter for the first coast engagement diaphragm spring and the second coast engagement diaphragm spring.

5. The double coast engagement diaphragm spring of claim 1, wherein the first coast engagement diaphragm spring is disposed between the drive flange and the spacer ring.

6. The double coast engagement diaphragm spring of claim 5, wherein the first coast engagement diaphragm spring is configured to exert the first axial thrust onto the turbine so as to keep a lockup clutch engaged during drive conditions and during coasting conditions.

7. The double coast engagement diaphragm spring of claim 6, wherein the spacer ring is configured to conduct the first axial thrust from the first coast engagement diaphragm spring through an inner diameter of the second coast engagement diaphragm spring to the turbine.

8. The double coast engagement diaphragm spring of claim 7, wherein the first axial thrust is low enough such that the turbine does not apply a drive torque to a transmission input shaft.

9. The double coast engagement diaphragm spring of claim 1, wherein the drive flange includes ramps configured to engage the second coast engagement diaphragm spring during coasting conditions.

10. The double coast engagement diaphragm spring of claim 9, wherein the ramps engage the second coast engagement diaphragm spring when a damper assembly of the torque converter is in coast.

11. The double coast engagement diaphragm spring of claim 10, wherein the second coast engagement diaphragm spring exerts the second axial thrust on the turbine in addition to the first axial thrust due to the first coast engagement diaphragm spring.

12. A method for a double coast engagement diaphragm spring for a torque converter, comprising:
    configuring a first coast engagement diaphragm spring to exert a first axial thrust onto a turbine;
    configuring a second coast engagement diaphragm spring to exert a second axial thrust onto the turbine;
    disposing a spacer ring between the first coast engagement diaphragm spring and the second coast engagement diaphragm spring;
    forming a drive flange to engage the second coast engagement diaphragm spring during coasting conditions; and
    configuring a retainer plate to disengage the second coast engagement diaphragm spring during drive conditions.

13. The method of claim 12, wherein disposing the spacer ring includes arranging the first coast engagement diaphragm spring and the second coast engagement diaphragm spring in series.

14. The method of claim 13, wherein arranging includes configuring the first coast engagement diaphragm spring to exert the first axial thrust onto the turbine so as to keep a lockup clutch engaged during drive conditions and during coasting conditions.

15. The method of claim 14, wherein arranging includes configuring the spacer ring to conduct the first axial thrust from the first coast engagement diaphragm spring through an inner diameter of the second coast engagement diaphragm spring to the turbine.

16. The method of claim 15, wherein arranging includes configuring the first coast engagement diaphragm spring such that the first axial thrust is low enough such that the turbine does not apply a drive torque to a transmission input shaft.

17. The method of claim 12, wherein forming the drive flange includes forming ramps on the drive flange configured to engage the second coast engagement diaphragm spring during coasting conditions.

18. The method of claim 17, wherein forming the ramps includes configuring the ramps to engage the second coast engagement diaphragm spring when a damper assembly of the torque converter is in coast.

19. The method of claim 18, wherein forming the ramps includes configuring the second coast engagement diaphragm spring to exert the second axial thrust on the turbine in addition to the first axial thrust due to the first coast engagement diaphragm spring.

20. A method for a double coast engagement diaphragm spring for a torque converter, comprising:
    configuring a first coast engagement diaphragm spring to continuously exert a first axial thrust onto a turbine;
    configuring a second coast engagement diaphragm spring to exert a second axial thrust onto the turbine;
    arranging the first coast engagement diaphragm spring and the second coast engagement diaphragm spring in series;
    configuring a spacer ring to be disposed between the first coast engagement diaphragm spring and the second coast engagement diaphragm spring;
    configuring a drive flange to engage the second coast engagement diaphragm spring during coasting conditions; and
    configuring a retainer plate to disengage the second coast engagement diaphragm spring during drive conditions.

* * * * *